United States Patent
Zhu et al.

(10) Patent No.: US 10,965,220 B2
(45) Date of Patent: Mar. 30, 2021

(54) NON-ISOLATED INVERTING APPARATUS, CONTROL METHOD THEREOF AND PHOTOVOLTAIC SYSTEM HAVING THE SAME

(71) Applicant: Delta Electronics (Shanghai) Co., Ltd., Shanghai (CN)

(72) Inventors: Xuancai Zhu, Shanghai (CN); Bingwen Weng, Shanghai (CN); Qin Wang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/805,817

(22) Filed: Mar. 1, 2020

(65) Prior Publication Data
US 2020/0403529 A1    Dec. 24, 2020

(30) Foreign Application Priority Data
Jun. 18, 2019    (CN) .......................... 201910527412.3

(51) Int. Cl.
*H02M 7/53*    (2006.01)
*H02M 7/537*    (2006.01)
*H02M 7/539*    (2006.01)
*H02M 1/12*    (2006.01)

(52) U.S. Cl.
CPC ........... *H02M 7/537* (2013.01); *H02M 7/539* (2013.01); *H02M 1/126* (2013.01)

(58) Field of Classification Search
CPC ....... H02M 7/537–5395; H02M 1/126; H02M 7/4826; H02M 7/48; H02M 3/07–073
See application file for complete search history.

(56) References Cited

U.S. PATENT DOCUMENTS

| | | | | |
|---|---|---|---|---|
| 5,576,940 | A * | 11/1996 | Steigerwald | H02J 1/102 363/17 |
| 5,774,351 | A * | 6/1998 | Hsieh | H02M 7/4807 363/132 |
| 10,622,881 | B2 * | 4/2020 | Cyr | H02M 3/158 |
| 2011/0019453 | A1 * | 1/2011 | Gonzalez Senosiain | H02M 7/48 363/131 |
| 2013/0301314 | A1 * | 11/2013 | Fu | H02J 3/383 363/37 |

FOREIGN PATENT DOCUMENTS

| | | | |
|---|---|---|---|
| CN | 107959429 A | * | 4/2018 |
| CN | 108448918 A | | 8/2018 |
| CN | 108988675 A | | 12/2018 |

* cited by examiner

*Primary Examiner* — Rafael O De Leon Domenech
(74) *Attorney, Agent, or Firm* — CKC & Partners Co., LLC (57) ABSTRACT

An inverting apparatus comprises: a DC port; an AC port; five switches; a first capacitor coupled between the first terminal of the second switch and the second terminal of the fourth switch; and a free-wheeling element coupled between the second terminal of the third switch and the second terminal of the fifth switch; wherein the five switches are controlled so that the device can switch among a plurality of operating modes and transmit active or reactive power to a power grid.

12 Claims, 14 Drawing Sheets

NON-ISOLATED INVERTING APPARATUS, CONTROL METHOD THEREOF AND PHOTOVOLTAIC SYSTEM HAVING THE SAME

CROSS-REFERENCE TO RELATED APPLICATIONS

This non-provisional application claims priority under 35 U.S.C. § 119(a) on Patent Application No. 201910527412.3 filed in P.R. China on Jun. 18, 2019, the entire contents of which are hereby incorporated by reference.

BACKGROUND OF THE INVENTION

The invention relates to an inverter, and specifically to a non-isolated inverting apparatus, a control method thereof and a photovoltaic system having the same.

Thanks to abundant resources and wide distribution, photovoltaic power generation has shown good prospect as renewable energy. In the grid-connected photovoltaic power generation system, a grid-connected inverter plays a role of converting a DC voltage generated by photovoltaic panels into an AC voltage to be connected to a power grid. As an important interface between the photovoltaic panels and the power grid, the grid-connected inverter can be configures as an isolated inverter (or "an isolated inverter system") or a non-isolated inverter (or "a non-isolated inverter system") depending on whether an isolated transformer is implemented in the inverter. In an isolated inverter system, a high-frequency transformer is mounted on a DC side, or a low frequency transformer is mounted on an AC side. The transformer converts the DC voltage of the photovoltaic panels, and also isolates the DC side from the AC side. However, existence of the transformer also causes increased loss, reduced efficiency, more volume and more cost. A non-isolated inverter, however, overcomes the above disadvantages of the isolated inverter system since the transformer can be removed, and thus is widely researched in academia and industry. However, due to the lack of isolation, a non-isolated inverter system has various new issues related to reliability, efficiency, the maximum power point tracking, leakage current and the like.

Moreover, in the photovoltaic grid-connected power system, since a single solar panel has a low output voltage, generally a plurality of solar panels are configured to be in series-parallel connection to form a photovoltaic array, which occupies a large area, thus forms a relatively large parasite capacitance between the photovoltaic array and ground, especially in humid environment. Generally, the non-isolated grid-connected inverter circuit works in high frequency range, and may generate a high-frequency voltage interference signal on the DC voltage output from the photovoltaic array, thereby generating a high-frequency leakage current (which is also called as a common mode current) on the parasite capacitance of the photovoltaic array. The high-frequency leakage current causes undesired conduction and interference, increases harmonic proportion of a grid current and loss of the system, and also threatens safety of relevant equipment and personnel. Therefore, suppression of the common mode current is always the first issue to be solved in the grid-connected non-isolated photovoltaic inverter.

In the prior art, a topological structure of the grid-connected photovoltaic inverter generally is in half-bridge or full-bridge forms. The half-bridge structure can reduce the common mode current effectively, but cannot satisfy requirement on conversion efficiency of the grid-connected photovoltaic inverter due to a low utilization ratio of the voltage on the DC side. The full-bridge topological structure, such as H4 full-bridge structure, Heric full-bridge structure and the like, can also reduce the common mode current effectively. In the H4 full-bridge structure, the common mode current is also small under the condition of bipolar PWM control, but due to a large fluctuation of the inductor during filtering, the resistance of the inductor is required to be increased, so that cost of the photovoltaic power system is further increased, and conversion efficiency of the grid-connected photovoltaic inverter is reduced. Regarding the Heric topology, although the issue of leakage current can be solved effectively, the cost is high, and the conversion efficiency is not optimal.

BRIEF SUMMARY OF THE INVENTION

The invention provides a non-isolated inverting apparatus, comprising:

a DC port comprising a first terminal and a second terminal;

an AC port comprising a first terminal and a second terminal;

five switches comprising a first switch, a second switch, a third switch, a fourth switch and a fifth switch, each of the switches having a first terminal, a second terminal and a third terminal, wherein the first terminal of the first switch and the first terminal of the fifth switch are electrically coupled to the first terminal of the DC port, the second terminal of the second switch and the first terminal of the fourth switch are electrically coupled to the second terminal of the DC port as well as the second terminal of the AC port, the first terminal of the third switch and the second terminal of the first switch are electrically coupled to the first terminal of the AC port, and the second terminal of the third switch is electrically coupled to the second terminal of the fourth switch;

a first inductor electrically coupled between the first terminal of the second switch and the second terminal of the fifth switch;

a first capacitor electrically coupled between the first terminal of the second switch and the second terminal of the fourth switch; and a free-wheeling element electrically coupled between the second terminal of the third switch and the second terminal of the fifth switch;

wherein the five switches are configured to be controlled via the third terminal respectively, according to control signals, so that the inverting apparatus can switch among a plurality of operating modes and transmit an active power or a reactive power to a power grid, and in at least one of the operating modes, only one switch connected between the AC port and the DC port is turned on.

The invention further provides a photovoltaic system having any one of the non-isolated inverting apparatus mentioned-above, wherein the DC port is electrically coupled to at least one photovoltaic panel, and the AC port is electrically coupled to a power grid.

The invention can reduce the switching loss of devices effectively, improve conversion efficiency of the grid-connected photovoltaic power system, and reduce cost of the grid-connected photovoltaic power system. Further, the invention can suppress the common mode current significantly.

Hereinafter detailed descriptions are given, and the technical solution of the invention is further explained with reference to the embodiments.

BRIEF DESCRIPTION OF THE DRAWINGS

To make the above and other objects, features, advantages and examples of the invention much obvious and clearer, the drawings are as follows.

DETAILED DESCRIPTION OF THE INVENTION

To describe the invention clearly and completely, it is possible to refer to the accompanying drawings and the various embodiments below, and the same numbers in the drawings represent the same or similar components. On the other hand, the commonly known components and steps are not described in the embodiments to avoid unnecessary limitation to the invention. In addition, to simplify the drawings, some known common structures and elements are drawn in a manner of simple illustration in the drawings.

Hereinafter specific implementation of the invention is further explained with reference to the accompanying drawings and examples, but the protection scope of the invention is not limited thereto. It shall be noted that procedures or signs that are not particularly and explicitly explained can be understood or achieved by those skilled in the art with reference to the prior art.

Figure 1A:
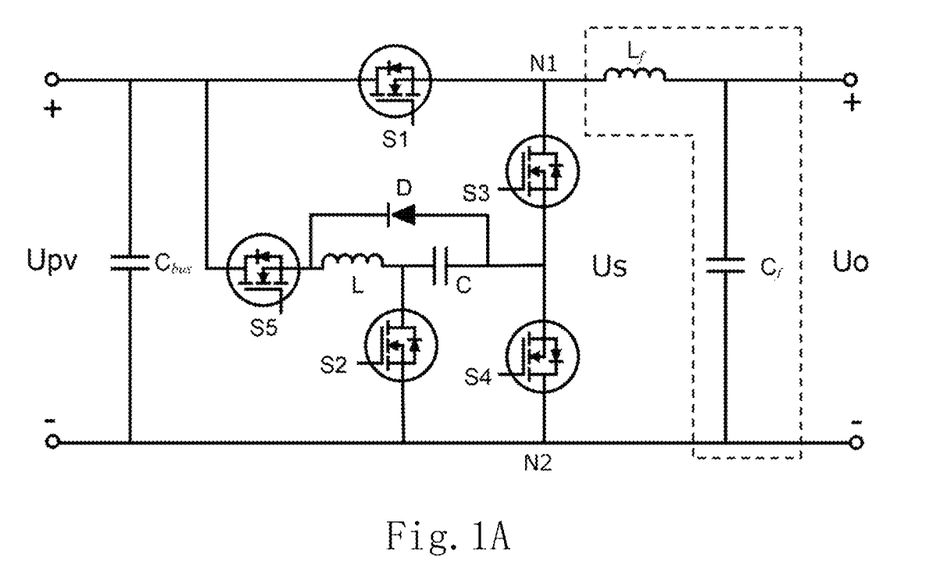
FIG. 1A is a schematic diagram of a circuit structure of a preferable non-isolated inverting apparatus according to the invention.
Figure 1B:
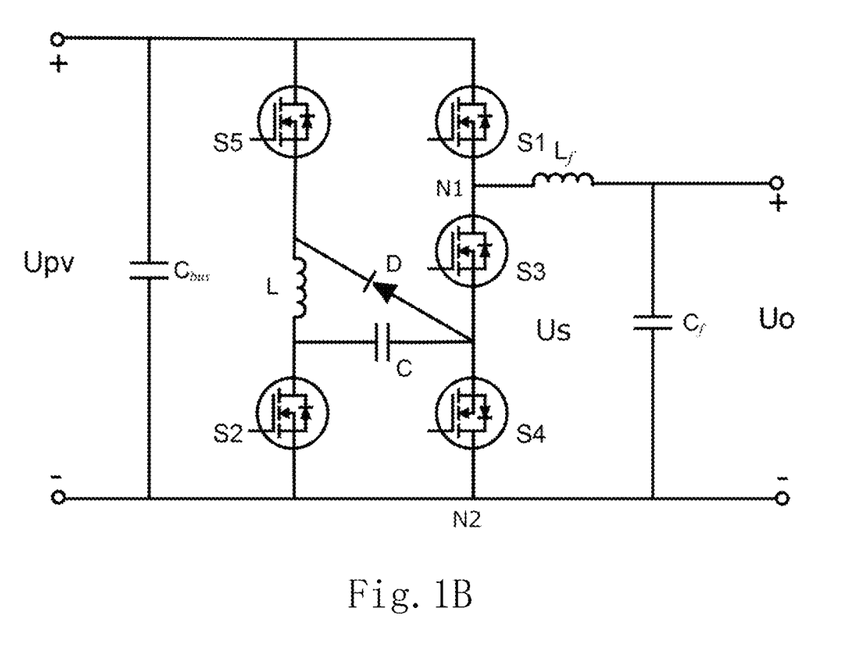
FIG. 1B is a transformed diagram of the circuit structure in FIG. 1A to facilitate understanding.

A circuit structure of a preferable non-isolated inverting apparatus of the invention is shown in FIG. 1A, and to facilitate understanding, it is transformed as shown in FIG. 1B. The circuit structure may be applied in a grid-connected photovoltaic system, and may convert a DC voltage $U_{pv}$ into an AC voltage $U_s$. The DC voltage $U_{pv}$ is the voltage between a first terminal (such as, the "+" terminal shown in FIG. 1A) and a second terminal (such as, the "−" terminal shown in FIG. 1A) of a DC port, and may be generated from at least one photovoltaic panel. The AC voltage $U_s$ is a voltage between a first terminal (such as, the terminal N1 shown in FIG. 1A) and a second terminal (such as, the terminal N2 shown in FIG. 1A) of a AC port, and the non-isolated inverting apparatus may convert the DC voltage generated by the photovoltaic panel into the AC voltage. As shown in FIG. 1A-1B, the inverting apparatus of the invention may comprise five switches S1 to S5, a first inductor L, a first capacitor C and a free-wheeling element (such as, a free-wheeling diode D). The five switches S1 to S5 comprise a first switch S1, a second switch S2, a third switch S3, a fourth switch S4 and a fifth switch S5, and each of them having at least a first terminal and a second terminal. Moreover, the first terminal of the first switch S1 and the first terminal of the fifth switch S5 are electrically coupled to the first terminal of the DC voltage $U_{pv}$ (such as, the "+" terminal shown in FIG. 1A), the second terminal of the second switch S2 and the first terminal of the fourth switch S4 are electrically coupled to the second terminal of the DC voltage $U_{pv}$ (such as, the "−" terminal shown in FIG. 1A) and the second terminal N2 of the AC voltage $U_s$, the first terminal of the third switch S3 and the second terminal of the first switch S1 are electrically coupled to the first terminal N1 of the AC voltage Us, and the second terminal of the third switch S3 is electrically coupled to the second terminal of the fourth switch S4. The first inductor L is electrically coupled between the first terminal of the second switch S2 and the second terminal of the fifth switch S5 to function as a filter at a power transmission phase and as a current source at a free-wheeling phase. The first capacitor C is electrically coupled between the first terminal of the second switch S2 and the second terminal of the fourth switch S4. The free-wheeling element may be a controllable or an uncontrollable switching device, such as, the free-wheeling diode D, which is electrically coupled between the second terminal of the third switch S3 and the second terminal of the fifth switch S5, and may provide a free-wheeling path if necessary.

In the invention, the five switches S1 to S5 are configured to be controlled by control signals respectively, so that the inverting apparatus may switch among a plurality of operating modes and transmit an active power or a reactive power to a power grid. Moreover, in at least one of the operating modes, only one switch connected between the AC voltage $U_s$ and the DC voltage $U_{pv}$ is turned on.

In the invention, preferably, the inverting apparatus may further comprise a filter circuit, as shown in a dashed box of FIG. 1, and the filter circuit is electrically coupled to the AC voltage $U_s$ for generating an output voltage $U_o$. The filter circuit may comprise a filter inductor $L_f$ electrically coupled between the first terminal N1 of the AC voltage $U_s$ and a first terminal (such as, the "+" terminal) of the output voltage $U_o$, and a filter capacitor $C_f$ coupled between the first terminal (such as, the "+" terminal) and a second terminal (such as, the "−" terminal) of the output voltage $U_0$.

In the invention, preferably, the DC voltage $U_{pv}$ and the AC voltage $U_s$ are both connected to ground. Preferably, a capacitor $C_{bus}$ may be coupled in parallel between the first terminal and the second terminal of the DC voltage $U_{pv}$.

Hereinafter various operating modes of a preferable non-isolated inverting apparatus of the invention when outputting an active power or a reactive power are explicitly explained with reference to FIGS. 2A-14B. FIGS. 2A-7B illustrate schematic diagrams and respective equivalent circuits in various operating modes when the non-isolated inverting apparatus of the invention outputs the active power, and FIGS. 8A-13B illustrate schematic diagrams and respective equivalent circuits in various operating modes when the non-isolated inverting apparatus of the invention outputs the reactive power. In order to show the circuit clearer, in FIGS. 2A, 3A, 4A, 5A . . . 13A, switches in OFF state and branches that are open are shown in grey.

Figure 2A:
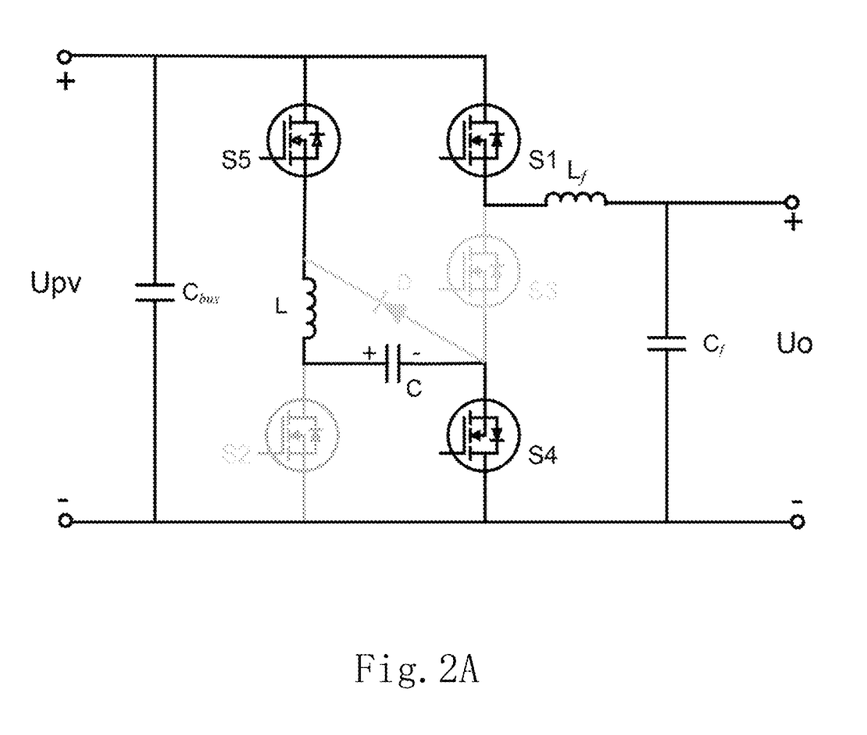
FIG. 2A is a schematic diagram in a first operating mode of positive half cycle when the non-isolated inverting apparatus outputs an active power according to the invention.
Figure 2B:
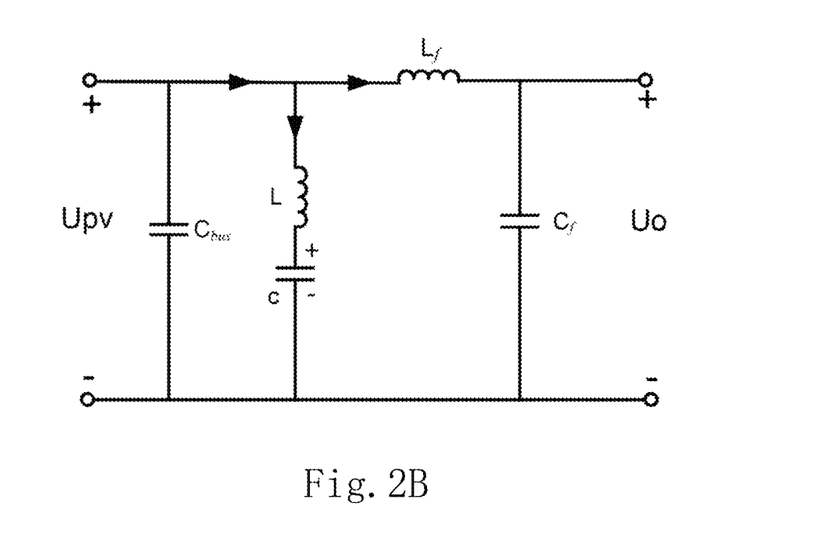
FIG. 2B is a schematic diagram of an equivalent circuit of FIG. 2A.
Figure 14A:
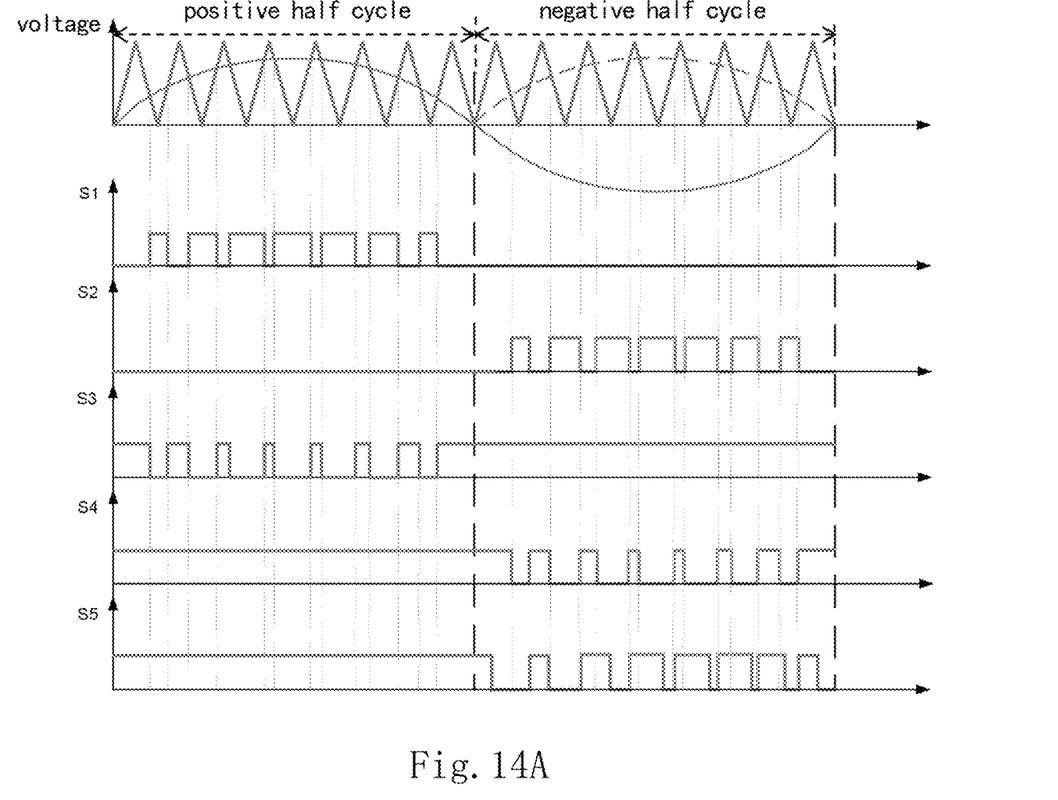
FIG. 14A waveforms of corresponding driving signals of respective switches during the negative half cycle and the negative half cycle in a preferable non-isolated inverting apparatus according to the invention.
Figure 14B:
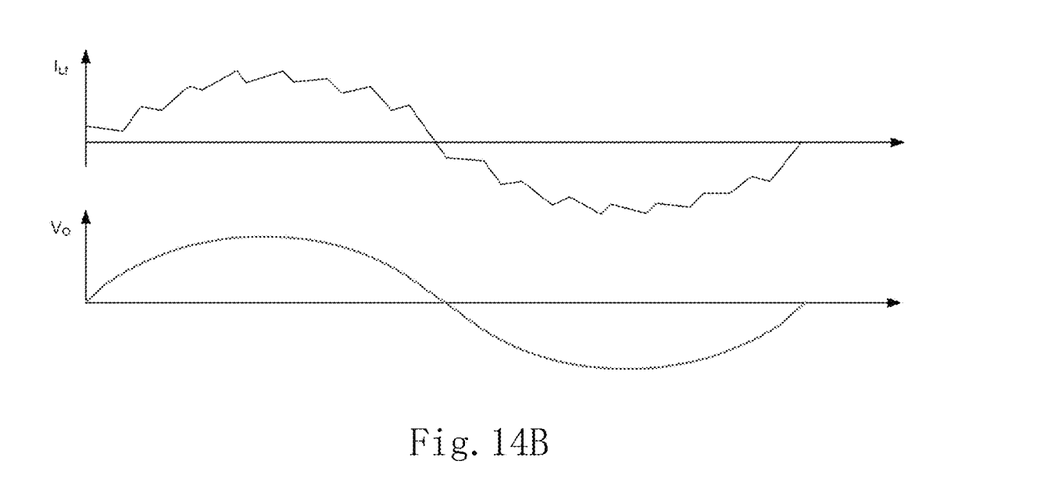
FIG. 14B is waveforms of an inductor current and an output voltage generated correspondingly by a preferable non-isolated inverting apparatus being controlled according to the driving signals as shown in FIG. 14A.

When the inverting apparatus outputs the active power (the power grid receives the active power), it may have six operating modes when working steadily, which are described respectively as follows:

(1) During a positive half cycle of a line voltage, the switch S5 and the switch S4 are maintained in ON state, the switch S2 is maintained in OFF state, and the switch S1 and the switch S3 are in a high-frequency switching state (i.e., may be controlled by pulse width modulation signals to perform high-frequency switching), turning on and off complementarily. Waveforms of driving signals of the switches S1 to S5 are shown in FIG. 14A, and an output inductor current and an output voltage generated correspondingly are shown in FIG. 14B. The inverting apparatus may have the following two operating modes in this condition:

Operating mode 1: the operating state of the inverting apparatus is shown in FIG. 2A, i.e., the switches S5, S4 and S1 are in ON state, and the switches S2 and S3 are in OFF state. The equivalent circuit of the operating mode 1 is shown in FIG. 2B. The DC voltage $U_{pv}$ boosts the filter inductor $L_f$, so that in this phase, an absolute value of an output inductor current $i_{Lf}(t)$ increases, the first inductor L is at an energy storing phase, and an voltage across the first capacitor C equals to the DC voltage $U_{pv}$.

Figure 3A:
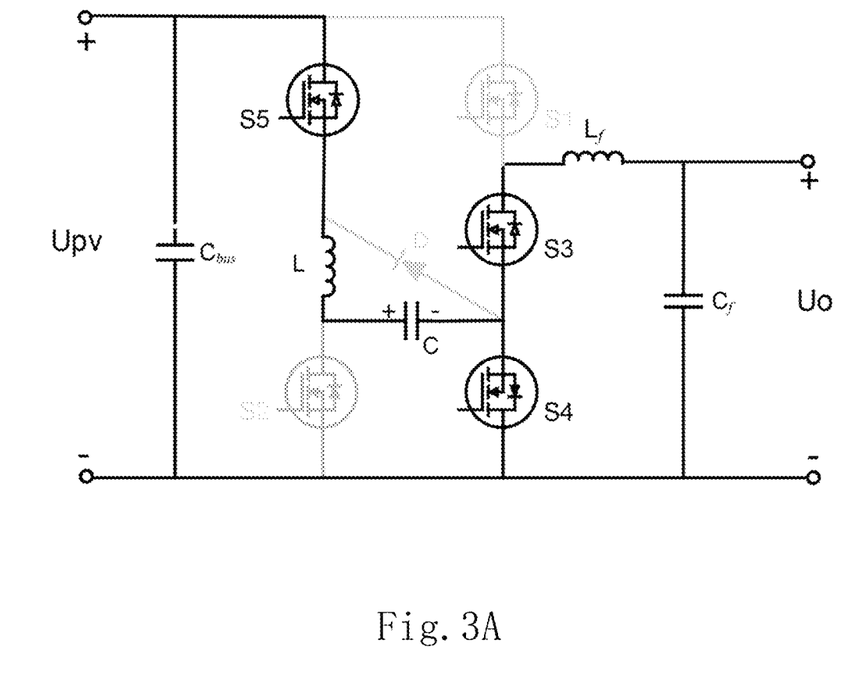
FIG. 3A is a schematic diagram in a second operating mode during the positive half cycle when the non-isolated inverting apparatus outputs the active power according to the invention.
Figure 3B:
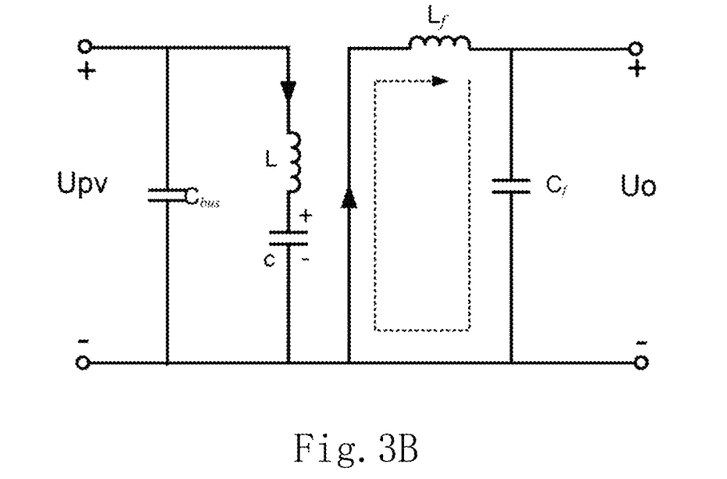
FIG. 3B is a schematic diagram of an equivalent circuit of FIG. 3A.

Operating mode 2: The operating state of the inverting apparatus is shown in FIG. 3A, i.e., the switches S5, S4 and S3 are in ON state, and the switches S1 and S2 are in OFF state. The equivalent circuit of the operating mode 2 is shown in FIG. 3B. Since the output inductor current cannot change abruptly, the switches S3 and S4 provide a free-wheeling path for it, energy in the filter inductor $L_f$ is then transferred to the filter capacitor $C_f$ and charges the filter capacitor $C_f$, and the absolute value of the output inductor current $i_{Lf}(t)$ decreases gradually.

As stated above, during the positive half cycle of the line voltage, the switches S1 and S3 that are controlled by SVPWM, turning on and off complementarily to output voltage $U_o$ in a sinusoidal waveform, as shown in FIG. 14B. The voltage across the first capacitor C equals to the DC voltage $U_{pv}$, and when the inverting apparatus works in the operating mode 1, only one switch (S1) connected between the AC voltage $U_s$ and the DC voltage $U_{pv}$ is turned on. Compared to the full-bridge topological structure, power loss of switches is reduced, and conversion efficiency is improved.

Figure 4A:
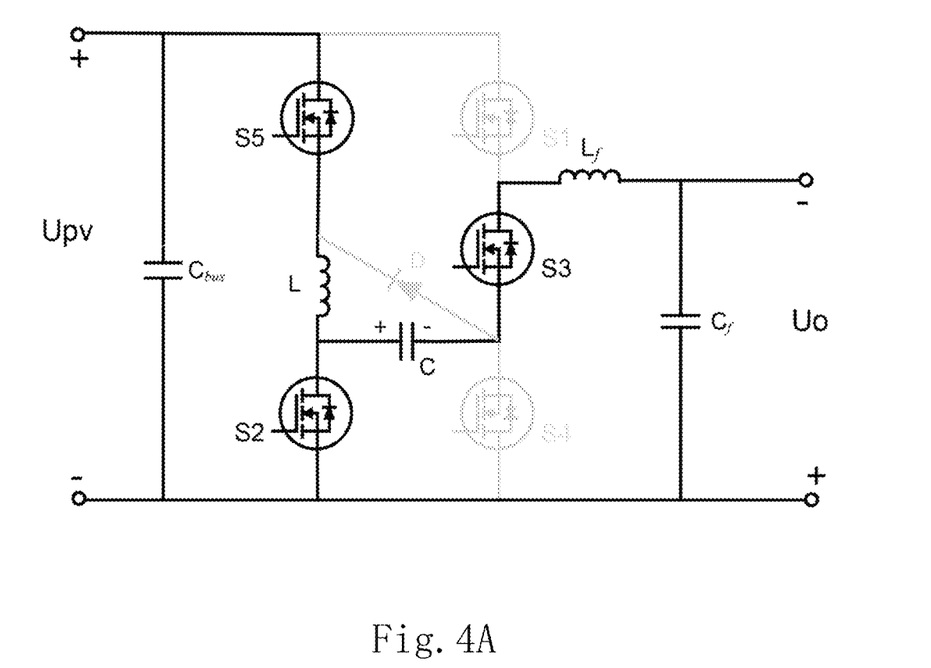
FIG. 4A is a schematic diagram in a third operating mode during the negative half cycle when the non-isolated inverting apparatus outputs the active power according to the invention.
Figure 4B:
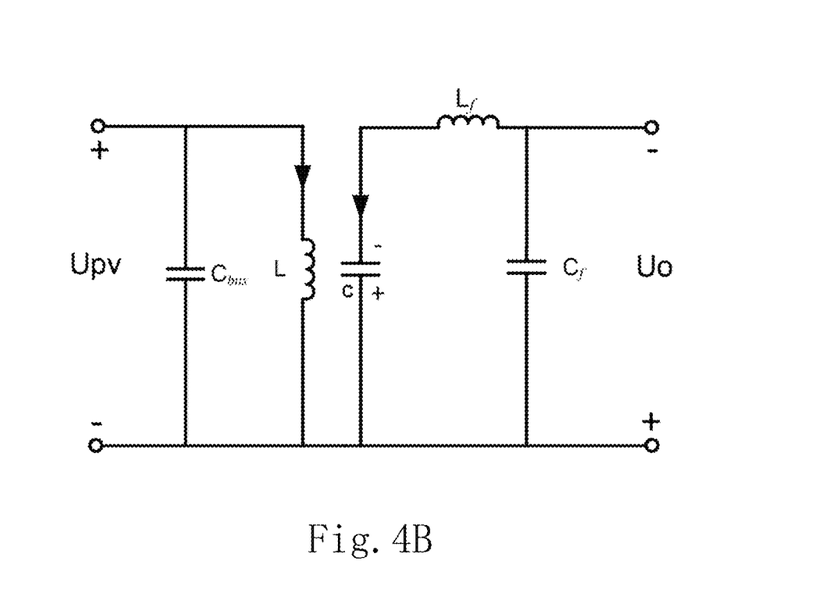
FIG. 4B is a schematic diagram of an equivalent circuit of FIG. 4A.

(2) During a negative half cycle of the line voltage, the switch S3 is maintained ON, the switch S1 is maintained OFF, and the switches S2, S4 and S5 are in a high-frequency switching state (i.e., may be controlled by pulse width modulation signals to perform high-frequency switching). The switches S2 and S4 are turning on and off complementarily, the switch S5 is turned on instantaneously when the switch S2 is turned off, and ON time of the switch S5 equals to ON time of the switch S2 (i.e., a duty cycle of the switch S5 equals to a duty cycle of the switch S2). The inverting apparatus may have the following four operating modes in this condition:

Operating mode 3: the operating state of the inverting apparatus is shown in FIG. 4A, i.e., the switches S2, S3 and S5 are in ON state, and the switches S1 and S4 are in OFF state. The equivalent circuit of the operating mode 3 is shown in FIG. 4B. The DC voltage $U_{pv}$ boosts the first inductor L, the absolute value of the inductor current $i_L(t)$ increases, and the first inductor L is at the energy storing phase. The output inductor current is supplied by the first capacitor C while the first capacitor C charges the filter capacitor $C_f$, and energy is transferred from the first capacitor C to the filter capacitor $C_f$.

Figure 5A:
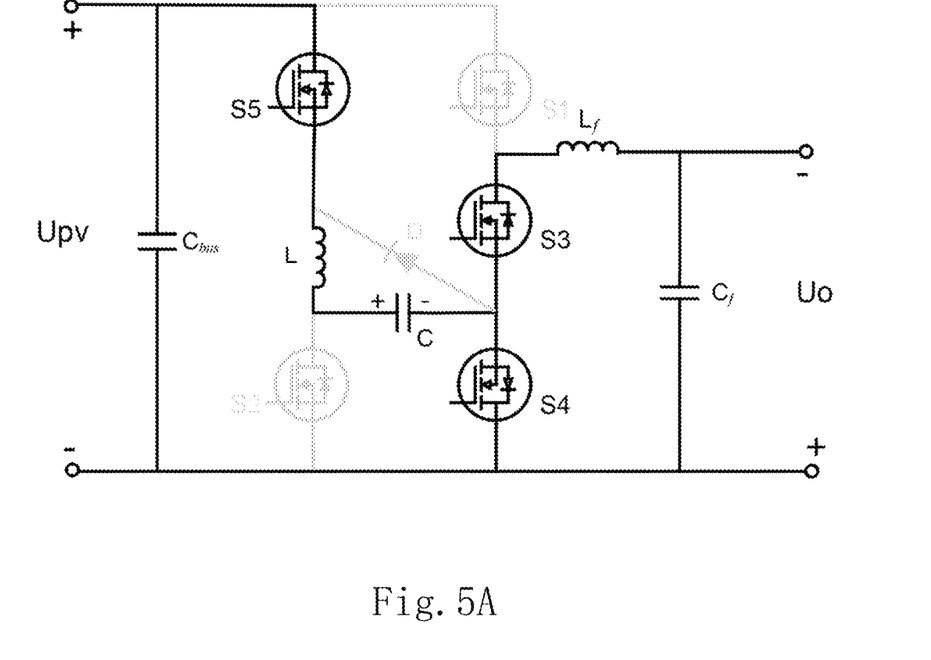
FIG. 5A is a schematic diagram in a fourth operating mode during the negative half cycle when the non-isolated inverting apparatus outputs the active power according to the invention.
Figure 5B:
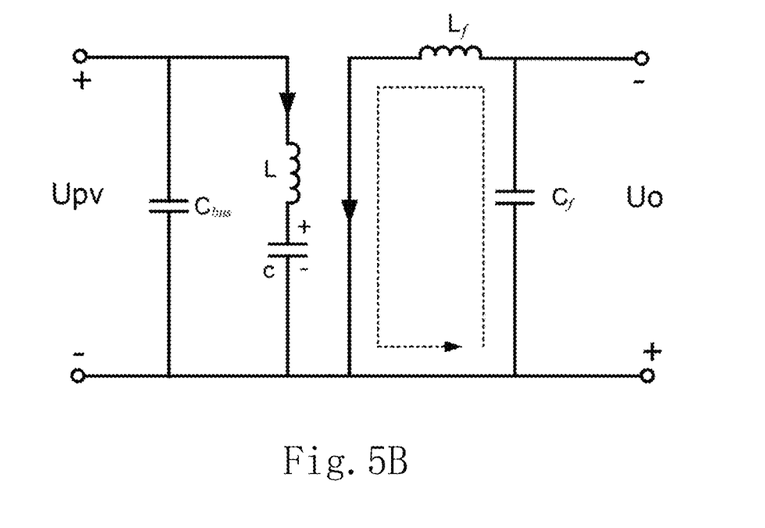
FIG. 5B is a schematic diagram of an equivalent circuit of FIG. 5A.

Operating mode 4: the operating state of the inverting apparatus is shown in FIG. 5A, i.e., the switches S3, S4 and S5 are in ON state, and the switches S1 and S2 are in OFF state. The equivalent circuit of the operating mode 4 is shown in FIG. 5B. The DC voltage $U_{pv}$ and the first inductor L charge the first capacitor C simultaneously. Since the current in the filter inductor $L_f$ cannot change abruptly, the switches S3 and S4 provide the free-wheeling path for it.

Figure 6A:
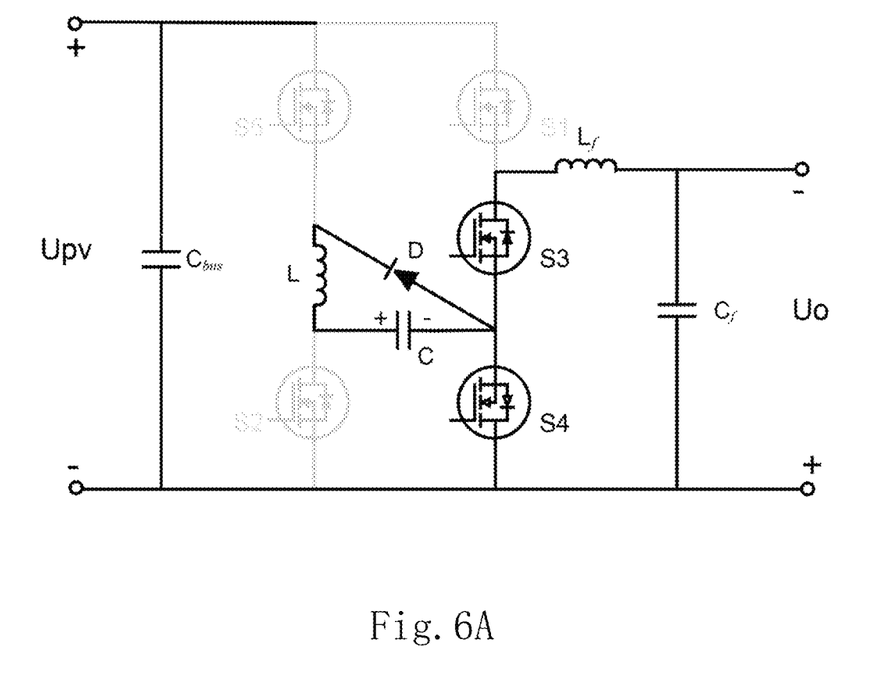
FIG. 6A is a schematic diagram in a fifth operating mode during the negative half cycle when the non-isolated inverting apparatus outputs the active power according to the invention.
Figure 6B:
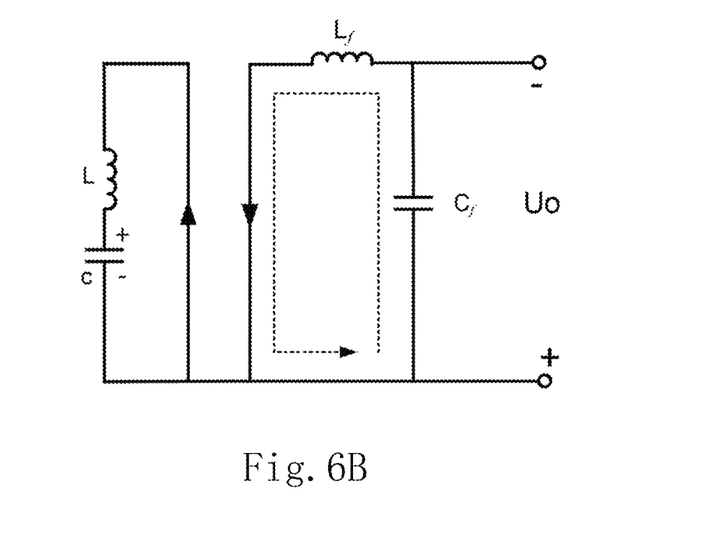
FIG. 6B is a schematic diagram of an equivalent circuit of FIG. 6A.

Operating mode 5: the operating state of the inverting apparatus is shown in FIG. 6A, i.e., the switches S3 and S4 are in ON state, and the switches S1, S2 and S5 are in OFF state. The equivalent circuit of the operating mode 5 is shown in FIG. 6B. In this condition, since the current in the first inductor L cannot change abruptly, the free-wheeling diode D provides the free-wheeling path for it. The current in the filter inductor $L_f$ can neither change abruptly, and the switches S3 and S4 provide the free-wheeling path for it.

Figure 7A:
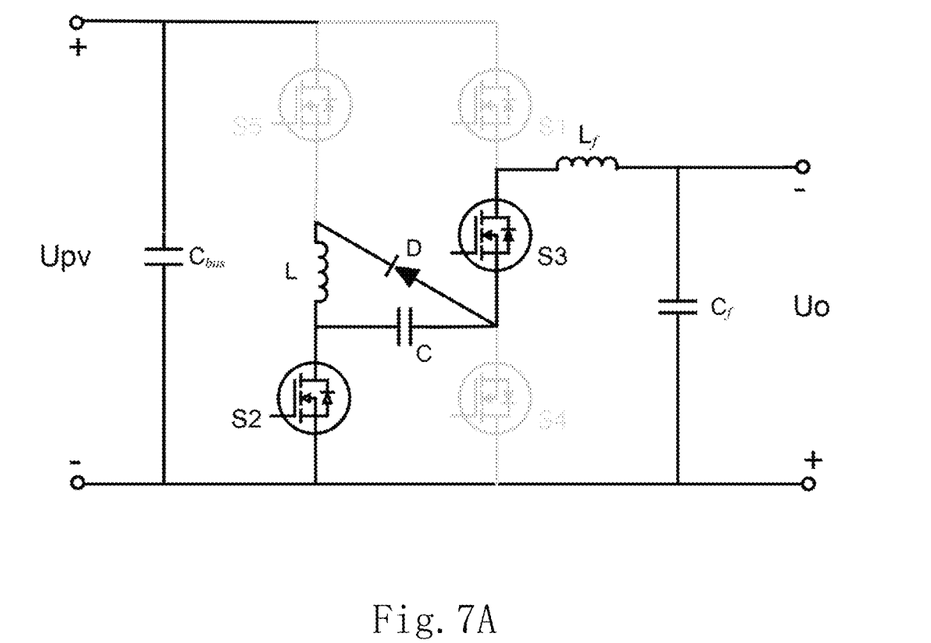
FIG. 7A is a schematic diagram in a sixth operating mode during the negative half cycle when the non-isolated inverting apparatus outputs the active power according to the invention.
Figure 7B:
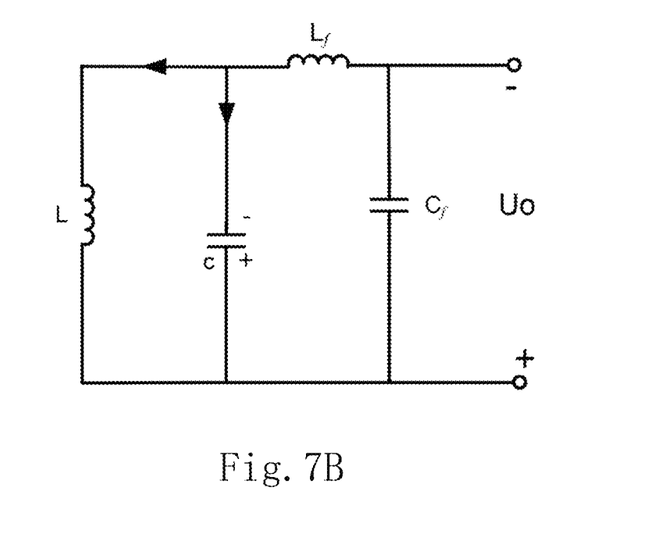
FIG. 7B is a schematic diagram of an equivalent circuit of FIG. 7A.
Figure 8A:
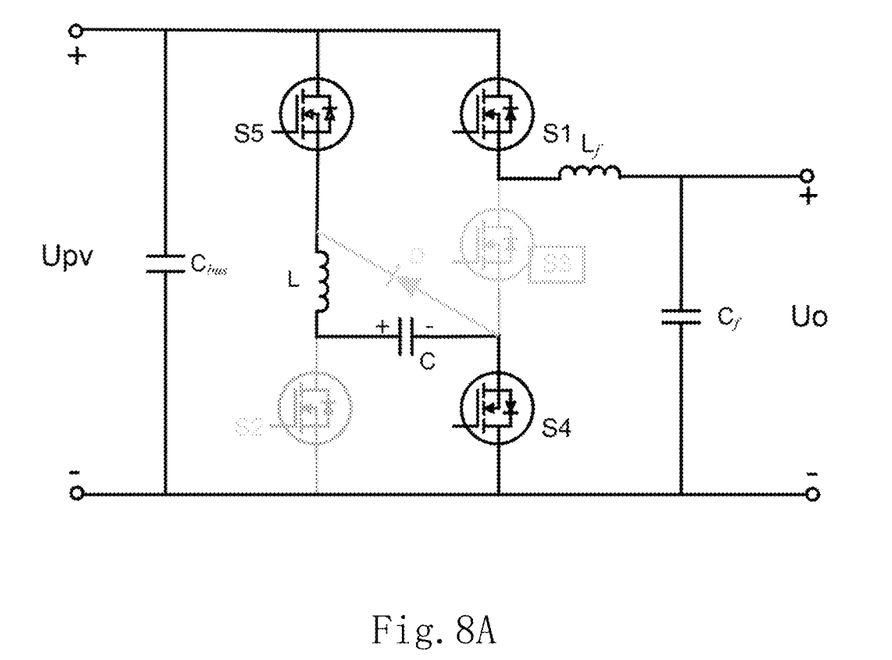
FIG. 8A is a schematic diagram in the first operating mode during the positive half cycle when the non-isolated inverting apparatus outputs a reactive power according to the invention.
Figure 8B:
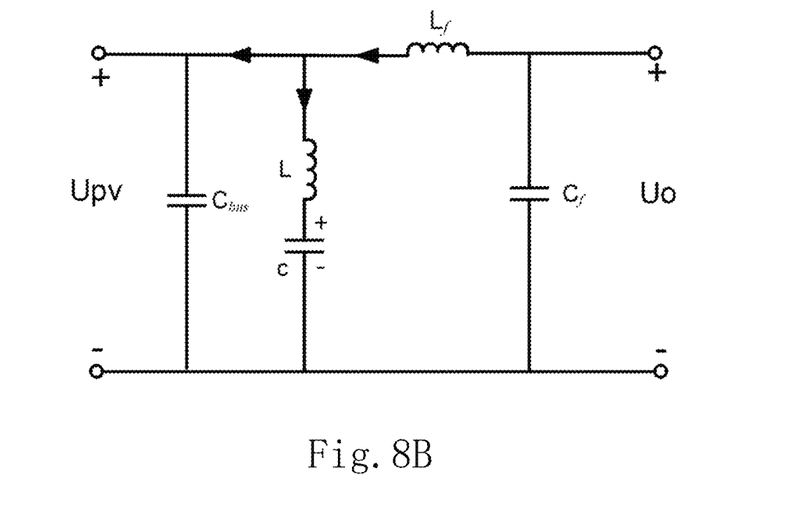
FIG. 8B is a schematic diagram of an equivalent circuit of FIG. 8A.
Figure 9A:
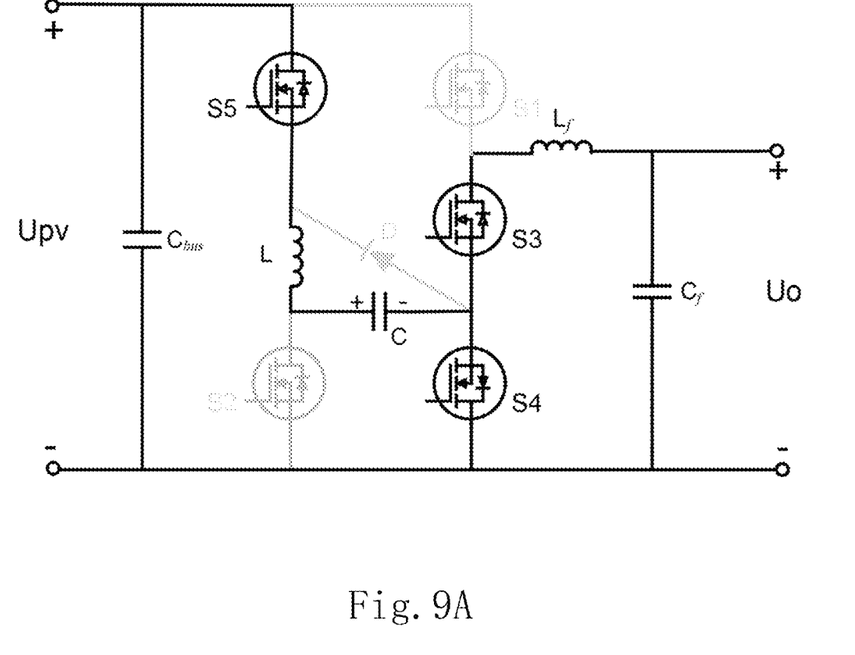
FIG. 9A is a schematic diagram in the second operating mode during the positive half cycle when the non-isolated inverting apparatus outputs the reactive power according to the invention.
Figure 9B:
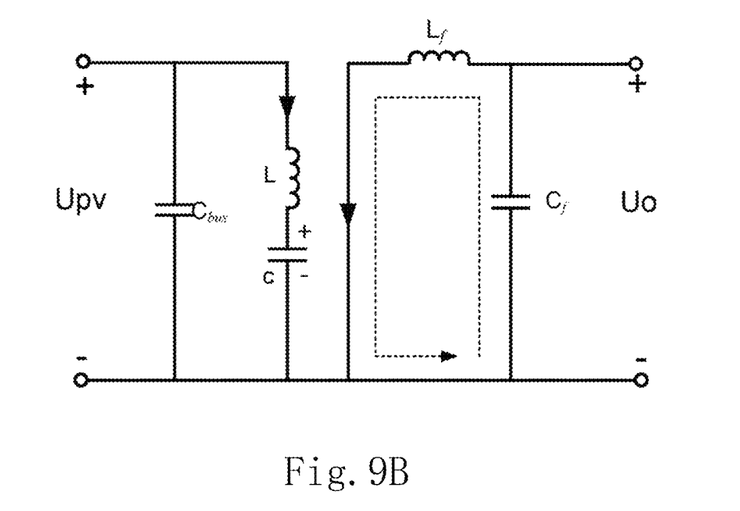
FIG. 9B is a schematic diagram of an equivalent circuit of FIG. 9A.
Figure 10A:
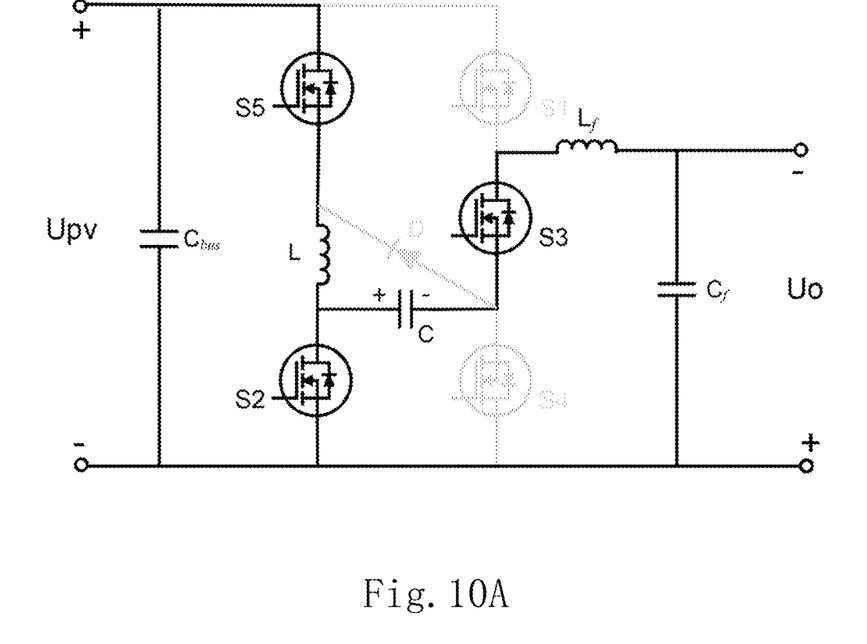
FIG. 10A is a schematic diagram in the third operating mode during the negative half cycle when the non-isolated inverting apparatus outputs the reactive power according to the invention.
Figure 10B:
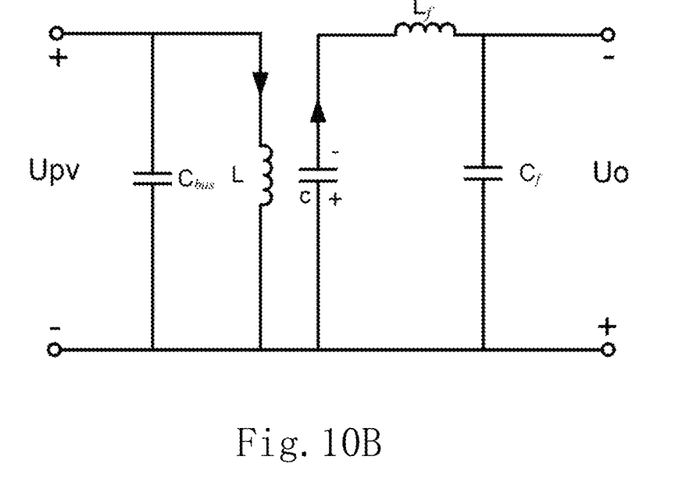
FIG. 10B is a schematic diagram of an equivalent circuit of FIG. 10A.
Figure 11A:
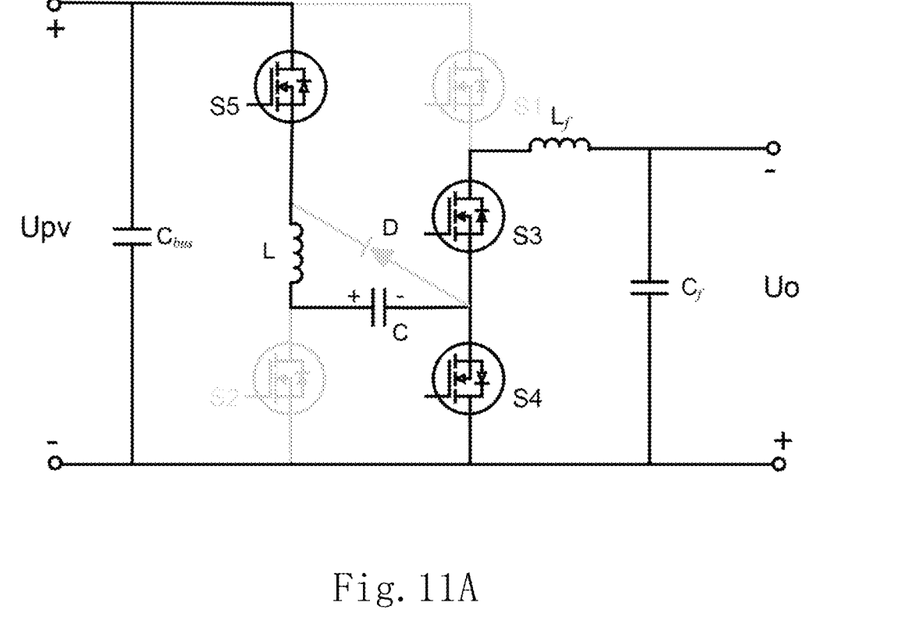
FIG. 11A is a schematic diagram in the fourth operating mode during the negative half cycle when the non-isolated inverting apparatus outputs the reactive power according to the invention.
Figure 11B:
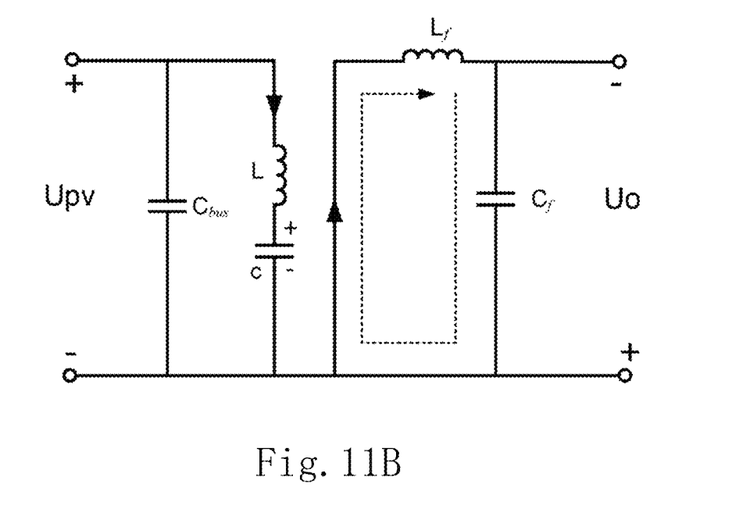
FIG. 11B is a schematic diagram of an equivalent circuit of FIG. 11A.
Figure 12A:
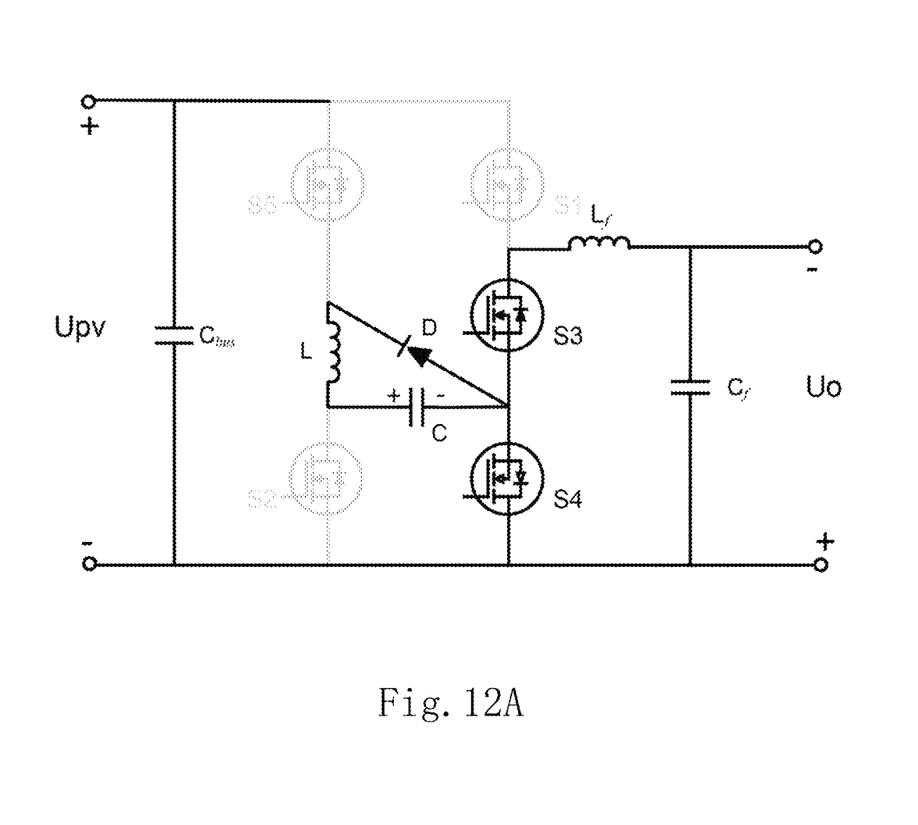
FIG. 12A is a schematic diagram in the fifth operating mode during the negative half cycle when the non-isolated inverting apparatus outputs the reactive power according to the invention.
Figure 12B:
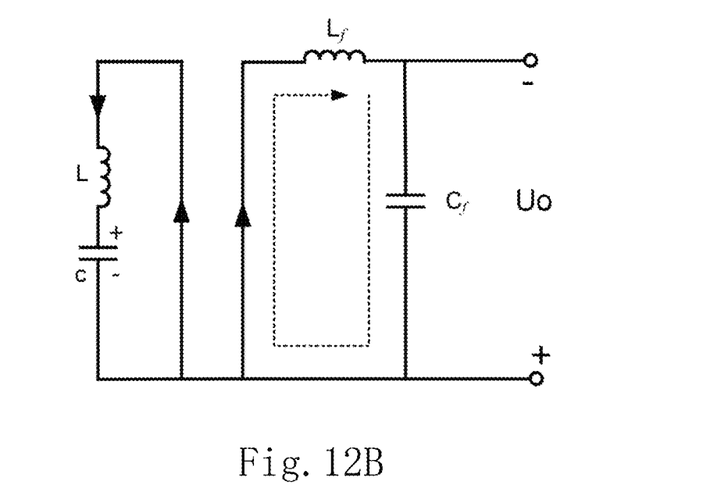
FIG. 12B is a schematic diagram of an equivalent circuit of FIG. 12A.
Figure 13A:
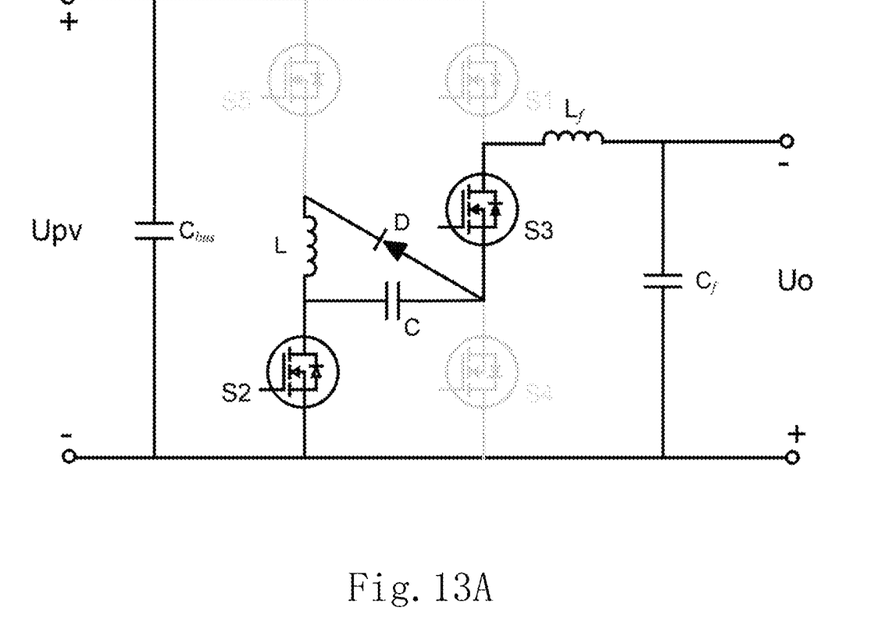
FIG. 13A is a schematic diagram in the sixth operating mode during the negative half cycle when the non-isolated inverting apparatus outputs the reactive power according to the invention.
Figure 13B:
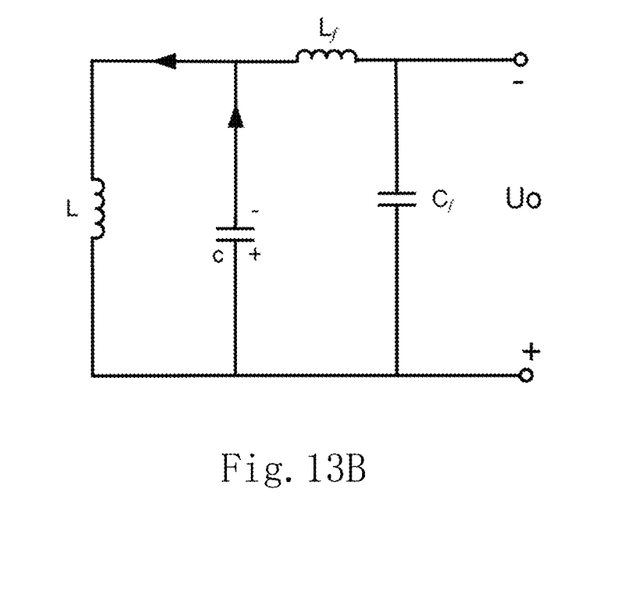
FIG. 13B is a schematic diagram of an equivalent circuit of FIG. 13A.

Operating mode 6: the circuit connection state of the inverting apparatus is shown in FIG. 7A, i.e., the switches S2 and S3 are in ON state, and the switches S1, S4 and S5 are in OFF state. The equivalent circuit of the operating mode 6 is shown in FIG. 7B. In this condition, the first capacitor C charges the filter capacitor $C_f$, and energy is transferred from the first capacitor C to the filter capacitor $C_f$.

As stated above, during the negative half cycle of the line voltage, the switches S2 and S4 of the inverting apparatus are controlled by SVPWM, turning on and off complementarily to output the voltage $U_o$ in a sinusoidal waveform, as shown in FIG. 14B.

In the invention, when the inverting apparatus outputs a reactive power, there are also six operating modes when it works steadily, and operating states and equivalent circuits are shown in FIGS. 8A-13B. Since the operating principles are similar to the operating principles when outputting an active power, except that the output inductor current is reversed (for example, current directions shown by dashed arrows in FIGS. 3B, 5B and 6B are reversed respectively, compared to the current directions shown by dashed lines in FIGS. 9B, 11B and 12B), and that the power grid absorbs the reactive power, so the details are not described again here.

The invention further provides a photovoltaic system having the non-isolated inverting apparatus (as shown in FIGS. 1A and 1B) as described above, wherein the DC voltage $U_{pv}$ may be, for example, generated from at least one photovoltaic panel, and the AC voltage $U_s$ may be electrically coupled to a power grid, for example, via a filter circuit. The non-isolated inverting apparatus may convert the DC voltage generated by the photovoltaic panel into an AC voltage.

Preferably, in the photovoltaic system of the invention, the photovoltaic panel and the power grid may be connected to ground in common, so a common mode voltage won't be generated on the stray capacitor of the photovoltaic panel, so that a common mode leakage current would be eliminated. In such way, the issue of the common mode leakage current due to the absence of transformer in the non-isolated inverter can be solved effectively.

In the invention, when the inverting apparatus works during the positive half cycle, the first switch S1 and the third switch S3 are in a high-frequency switching state, turning on and off complementarily, the second switch S2 is maintained in OFF state, and the fourth switch S4 and the fifth switch S5 are maintained in ON state. Preferably, the first switch S1 and the third switch S3 are controlled by pulse width modulation signals to perform high-frequency switching.

In the invention, when the inverting apparatus works during the negative half cycle, the first switch S1 is maintained in OFF state, the second switch S2 and the fourth switch S4 are in a high-frequency switching state, turning on and off complementarily, the third switch S3 is maintained in ON state, and the fifth switch S5 is in a high-frequency switching state. Preferably, the fifth switch S5 is turned on instantaneously when the second switch S2 is turned off, and ON time of the fifth switch S5 equals to ON time of the second switch S2. Moreover, preferably, the second switch S2, the fourth switch S4 and the fifth switch S5 are controlled by pulse width modulation signals to perform high-frequency switching.

In summary, the invention has the following advantages:
1) the loss of the high-frequency switching devices is reduced, and conversion efficiency of the inverting apparatus is improved;
2) by introducing a free-wheeling path, current will not pass through a body diode of the switching device in a free-wheeling phase, which improves efficiency;
3) an active power or a reactive power can be transferred, and the common mode leakage current can be suppressed effectively.

Although the invention has been disclosed by the embodiments, the invention is not limited thereto. Any skilled in the art may make various variations and modifications without departing from the spirit and scope of the invention. Therefore, the protection scope of the invention shall be determined by the scope defined by the appended claims.

What is claimed is:

1. A non-isolated inverting apparatus, comprising:
a DC port comprising a first terminal and a second terminal;
an AC port comprising a first terminal and a second terminal;
five switches comprising a first switch, a second switch, a third switch, a fourth switch and a fifth switch, each of the switches having a first terminal, a second terminal and a third terminal,
wherein the first terminal of the first switch and the first terminal of the fifth switch are electrically coupled to the first terminal of the DC port, the second terminal of the second switch and the first terminal of the fourth switch are electrically coupled to the second terminal of the DC port and the second terminal of the AC port, the first terminal of the third switch and the second terminal of the first switch are electrically coupled to the first terminal of the AC port, and the second terminal of the third switch is electrically coupled to the second terminal of the fourth switch;
a first inductor electrically coupled between the first terminal of the second switch and the second terminal of the fifth switch;
a first capacitor electrically coupled between the first terminal of the second switch and the second terminal of the fourth switch; and
a free-wheeling element electrically coupled between the second terminal of the third switch and the second terminal of the fifth switch;
wherein the five switches are configured to be controlled via the third terminal respectively, according to control signals, so that the inverting apparatus are switched among a plurality of operating modes and transmit an active power or a reactive power to a power grid, and that in at least one of the operating modes, only one switch connected between the AC port and the DC port is turned on.

2. The non-isolated inverting apparatus according to claim 1, wherein the inverting apparatus further comprises a filter circuit electrically coupled to the AC port and generating an output voltage, wherein the filter circuit comprises a filter inductor electrically coupled between the first terminal of the AC port and the output voltage, and a filter capacitor coupled in parallel to the output voltage.

3. The non-isolated inverting apparatus according to claim 1, wherein during the positive half cycle, the first switch and the third switch are in a high-frequency switching state, turning on and off complementarily; the second switch is maintained in OFF state, and the fourth switch and the fifth switch are maintained in ON state.

4. The non-isolated inverting apparatus according to claim 1, wherein during the negative half cycle, the first switch is maintained in OFF state, the second switch and the fourth switch are in a high-frequency switching state, turning on and off complementarily; the third switch is maintained in ON state, and the fifth switch is in a high-frequency switching state.

5. The non-isolated inverting apparatus according to claim 4, wherein the fifth switch is turned on instantaneously when the second switch is turned off, and conduction time of the fifth switch equals to conduction time of the second switch.

6. The non-isolated inverting apparatus according to claim 1, wherein the free-wheeling element comprises a controllable switching device or an uncontrollable switching device.

7. A photovoltaic system having the non-isolated inverting apparatus according to claim 1, wherein the DC port is electrically coupled to at least one photovoltaic panel, and the AC port is electrically coupled to a power grid.

8. A method of controlling the non-isolated inverting apparatus according to claim 1, comprising:
wherein during the positive half cycle, the first switch and the third switch are in a high-frequency switching state, turning on and off complementarily; the second switch is maintained in OFF state, and the fourth switch and the fifth switch are maintained in ON state.

9. The control method according to claim 8, wherein during the negative half cycle, the first switch is maintained in OFF state, the second switch and the fourth switch are in a high-frequency switching state, turning on and off complementarily; the third switch is maintained in ON state, and the fifth switch is in a high-frequency switching state.

10. The control method according to claim 9, wherein the fifth switch is turned on instantaneously when the second switch is turned off, and conduction time of the fifth switch equals to conduction time of the second switch.

11. The control method according to claim 9, wherein the second switch, the fourth switch and the fifth switch are controlled by pulse width modulation signals to perform high-frequency switching.

12. The control method according to claim 8, wherein the first switch and the third switch are controlled by pulse width modulation signals to perform high-frequency switching.

* * * * *